No. 99,415. A. F. DU FAUR. PATENTED FEB. 1, 1870.
FURNACE FOR MELTING AND REFINING IRON AND OTHER METALS.
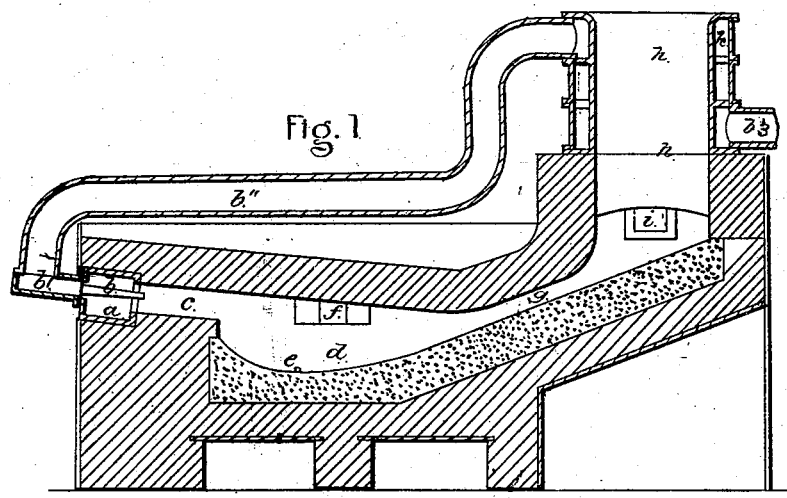
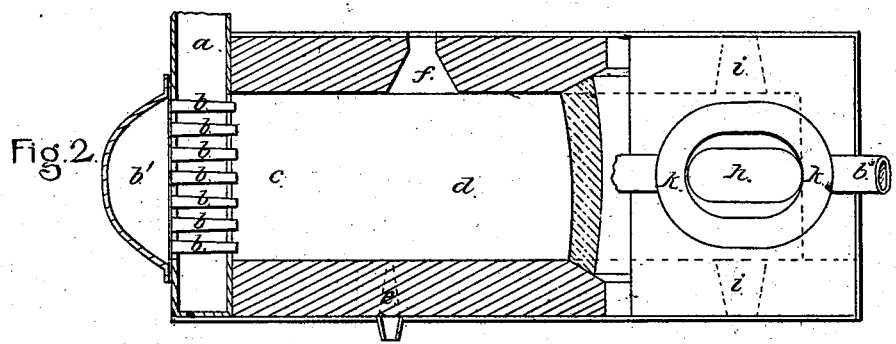
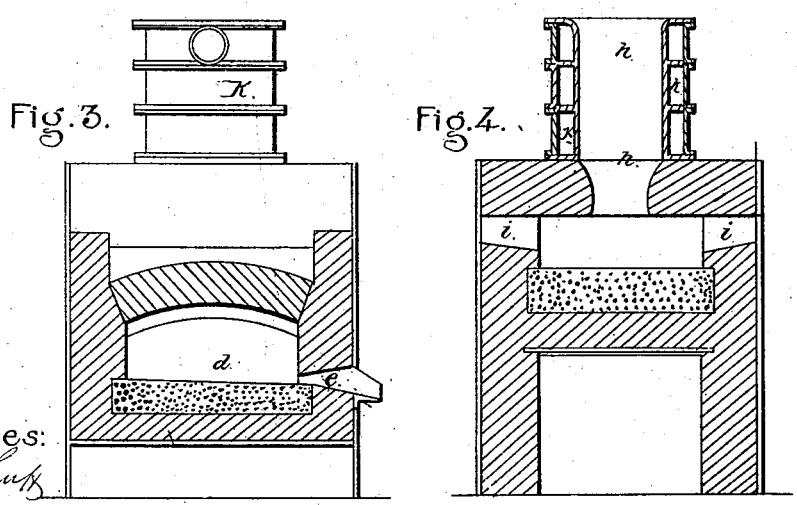
Witnesses:
Inventor: A. Faber du Faur

United States Patent Office.

ADOLPH FABER DU FAUR, OF NEW YORK, N. Y.

*Letters Patent No. 99,415, dated February 1, 1870.*

---

IMPROVED FURNACE FOR MELTING AND REFINING IRON AND OTHER METALS.

---

The Schedule referred to in these Letters Patent and making part of the same.

---

*To all whom it may concern:*

Be it known that I, ADOLPH FABER DU FAUR, of 90 Broadway, of the city, county, and State of New York, have invented a new and useful Improvement in Furnaces for Melting or Refining Iron and other Metals, and for remelting and manufacturing steel; and I do hereby declare the following to be a full, clear, and exact description thereof, which will enable those skilled in the art to make and use the same, reference being had to the accompanying drawing, forming part of this specification, in which drawing—

Figure 1 represents a longitudinal vertical section through the furnace.

Figure 2 is a horizontal section.

Figure 3 is a cross-section, taken in line with the tap-hole $e$.

Figure 4 is a vertical cross-section, taken through the stack.

Similar letters indicate corresponding parts.

This invention relates to furnaces for melting or re-refining iron and other metals, and for remelting and manufacturing steel; and consists in the construction and arrangement of a reverberatory or gas-furnace, in such a manner that the materials to be melted are charged into a stack, and the gases and products of combustion enter the charge at the bottom, and pass up around and through or between the materials, gradually heating them, and melting them off at the bottom, the molten mass or matter flowing down through an inclined channel or neck into the hearth, being exposed to and brought in direct contact with the flames and gases of the furnace, during its descent through the neck, and also after it has reached the hearth.

The letter $a$ designates a pipe, through which the gases are admitted to the fire-bridge, in the usual or any suitable manner, from a gas-generator, (not here shown.) When the gas-generator is connected directly with the furnace, this pipe may be omitted, and the gases may be introduced from below.

The letter $b$ designates nozzles, through which the hot blast for the combustion of the gases is supplied. These nozzles may be so arranged that they can be made to incline or dip more or less, at pleasure. They are set in a distributing-chamber, $b^1$, which communicates through the delivery-pipe $b^2$, with the air-heating apparatus $k$ arranged around the stack, fresh air being introduced into the heating-apparatus through the supply-pipe $b^3$. The quantity of air is regulated by a valve, (not here shown.)

The letter $c$ designates the fire-bridge, and $d$, the hearth. At the lowest part of the hearth, I provide a tap-hole, $e$, for running out the metal. (See figs. 1, 2, and 3.) One or more small doors $f$ are arranged on one or both sides of the hearth, to give access thereto for stirring the metal, or taking out samples with a suitable ladle.

The letter $g$ is the neck of the furnace, over the bottom of which the molten mass, as it comes from the stack, passes into the hearth.

The letter $h$ designates the stack for receiving the charge. Its construction and its arrangement with reference to the furnace is shown in the several figures of the drawing. It is made narrower than the width of the neck $g$, so as to allow the gases and products of combustion to enter the stack from all sides, and thereby heat the materials uniformly. In order to give access to the charge for loosening up the materials, if required, I provide small openings $i$ with doors, at or below the lower part of the stack, as shown in figs. 1, 2, and 4.

My furnace may be operated by a forced draught from a fan or other blowing engine; but, if preferred, a draught by a chimney, suction-engine, or steam-jet may be employed.

It will be observed, that as my furnace is charged directly through the stack, the doors $f$ of the furnace can be made very small, thereby preventing the loss of heat occasioned by large openings. The cinders or slag may be raked out through the doors, or tapped through a hole provided at at any desired level above the lowermost tap-hole.

For blowing on the metal for the purpose of refining it, the tuyeres are placed on one or both sides of the hearth, in the manner well known to the trade. I have not shown any tuyeres in my drawing, as their construction and use are familiar to those skilled in the art.

The manner of using and operating my furnace is as follows:

After the furnace is properly heated up, the materials to be melted are charged at the tunnel-head or top of the stack, and the stack filled to the top, or any desired height. The hot gases passing through the materials from below, will melt them off at the bottom, the molten mass flowing down through the neck $g$ to the hearth. A thin film of the liquid-metal is thus always exposed to the heat, and only melted and well heated metal will reach the hearth, which, consequently, will retain the highest temperature that the fuel is capable of producing, without ever being cooled, as it would be if cold or solid materials were charged directly on the hearth, as in the old method.

If the metal is to be refined, hot air may be blown on it. In this way iron may be decarbonized to any desired degree, so as to make steel or malleable iron. For accelerating decarbonization, I charge iron-ore, or other decarbonizing substances, in proper proportions, with the iron in the stack, or wrought and cast-iron together may be run through the stack. The nature of the flame, whether having a surplus of oxygen or not, as regulated by the relative quantities of air and gas admitted, will also influence the quality of the product.

The advantages of this furnace are, among other things, that no cold or solid metal is allowed to reach the hearth, which, consequently, retains its heat without being chilled; the consumption of fuel is reduced to a minimum, as the heat, which in ordinary furnaces is wasted, is transferred to the charge and to the blast; materials which, when charged directly on the hearth, as in the old method, are difficult to melt, because they receive heat only from above, will melt more readily, because they are exposed uniformly to the heat; the metal fills the hearth gradually; its quality can be examined from time to time, so as to control it by alterations in the charge or by the blast and nature of the flame.

I do not claim any of the long-known processes for refining cast-iron by blowing on it, or of melting pig-iron with decarbonizing substances, or with wrought-iron for making steel; but

What I claim as my invention, and desire to secure by Letters Patent, is—

1. In reverberatory or gas-furnaces, the stack $h$, constructed and arranged substantially as described.

2. Extending the neck $g$ so as to terminate below the stack, substantially as shown and described.

3. So arranging the stack $h$ and neck $g$ that the latter shall extend around the stack on all sides, whereby the gases and products of combustion will be caused to enter the stack on all sides thereof, substantially as set forth.

4. The air-heating apparatus $k$, in combination with the stack $h$, substantially as shown and described.

ADOLPH FABER DU FAUR.

Witnesses:
J. VAN SANTVOORD,
E. F. KASTENHUBER.